United States Patent [19]

Nakamura et al.

[11] 3,885,421

[45] May 27, 1975

[54] GLASS CONTAINER TESTING APPARATUS

[75] Inventors: Rikuzo Nakamura, Hanyushi; Hiromu Kishigami, Yokohama, both of Japan

[73] Assignees: Nittoku Metal Industry Co. Ltd.; Toyo Glass Company Ltd., both of Tokyo, Japan

[22] Filed: Dec. 20, 1973

[21] Appl. No.: 426,692

[52] U.S. Cl. .................................................. 73/94
[51] Int. Cl. ............................................ G01n 3/08
[58] Field of Search ........................ 73/88 R, 12, 94

[56] References Cited
UNITED STATES PATENTS

| | | | |
|---|---|---|---|
| 3,765,231 | 10/1973 | Erb et al. | 73/94 |
| 3,777,556 | 12/1973 | Zappia | 73/94 |

*Primary Examiner*—Jerry W. Myracle
*Attorney, Agent, or Firm*—Wenderoth, Lind & Ponack

[57] ABSTRACT

Testing apparatus adapted to detect glass containers having lowered strength due to the presence of blemishes, cracks, irregular thickness or foreign matters in the side wall of the glass containers or due to long service time. The testing apparatus comprises a container rotating roller having a rotating shaft parallel with the axial line of a glass container to be tested, a movable pusher shoe provided at a right angle to the axial line of the container that pushes by a power cylinder or a spring, said roller and said pusher shoe forming a path for the container, said container being rotated more than 180° by the friction between the roller and the pusher shoe and giving load to the whole circumference of the side wall of the container, a star wheel which rotates coaxially or eccentrically with the roller shaft synchronously with the rolling speed of the container at the time when the container is rotated between the pusher shoe and the roller, container receiving pockets arranged at equal intervals around the circumference of the star wheel, and brushes provided between the adjacent receiving pockets for protecting the glass containers adjacent to the container being tested from injury by broken pieces of the glass container when it is broken and for removing the broken pieces attached to the pusher shoe.

2 Claims, 4 Drawing Figures

GLASS CONTAINER TESTING APPARATUS

The present invention relates to a testing apparatus, and more particularly relates to a testing apparatus adapted for testing the strength of the side wall of glass containers.

Recently, the production and sales of glass containers has been increasing thanks to progresses and improvements of glass container producing machines or bottling machines, and along with these trends, improved accuracy and capacity of the glass container testing apparatus have been increasingly demanded for.

The strength of glass containers is lowered by the presence of blemishes, irregular thickness, foreign matters, unsatisfactory heat treatment and changes due to long service time. These defects are causes for breakages when the glass containers are given impact.

As for a method for detecting glass containers having such defects, there has been conventionally known a testing method in which the glass container is rotated 180° while being given loads from two opposing sides to produce stress all around the whole circumference of the side wall, thereby breaking glass containers having strength below the standard strength. The test based on the above principle is called a "simulate impact test." One example of the test apparatus for such tests is disclosed in U.S Pat. No. 3,618,370, according to which the glass containers to be tested are put one by one on a testing table and taken out one by one after the completion of the test.

In order to test glass containers moving on a conveyer line in the glass container manufacturing shops or in bottling shops, a continuous and high-speed testing capacity is required. The average production capacity of glass container producing machines is 60 to 150 bottles per minute, and a more modern machine can produce more than 200 bottles per minute. The capacity of high-speed bottling machines is 1200 bottles per minute.

As for the simulate impact test apparatus for continuous testing of various containers running on the conveyer line in glass container producing shops, one example is disclosed in Japanese Patent Laid-open No. Sho 47-16184 and corresponding U.S. Patent application Ser. No. 108,786.

The conventional simulate impact test apparatus as disclosed in the Japanese Patent Laid-open No. Sho 47-16184 is a mechanism based on the combination of container rotating rollers and shoes, arranged on a conveyer line to test containers moving on the conveyer one by one.

However, the conventional test apparatus has the following defects:

1. As the glass container is fed into the testing section between the container rotating roller and the shoe by the friction with the rotating roller and the shoe, if water for example, is present on the outer side of the wall, the friction coefficient is lowered so that the container is not supplied to the test section and the container rotates idly only. This defect causes a serious problem in the bottling shops where the glass containers have many chances of being wet.

2. In the case where the glass container is broken during the test, pieces of broken glass are dispersed all around. This means that there is a danger that the broken pieces will fly against glass containers adjacent the broken container and injure them. On the other hand, the broken pieces attach to the shoe and give adverse effects on glass containers to be subsequently tested.

3. As mentioned in the above (1), as the glass containers are supplied to the test section by the friction, it is not always assured that the containers are supplied to the test section one by one and there is the possibility that more than two containers will be supplied at the same time. This means that if two containers are supplied at the same time, the load given to the container is only a half of the normal load because the total pushing force is constant, and thus the test becomes inaccurate.

4. As the test section is provided on the conveyer line, when a glass container having strength below the standard strength is broken, the broken pieces remain on the conveyer, and it is necessary to remove the broken pieces from the conveyer. This hinders continuous testing.

Therefore, the object of the present invention is to provide a test apparatus which has overcome the above defects and can test automatically and at a high speed the strength of the side wall of various glass containers moving on conveyers in glass container manufacturing shops and bottling shops.

According to the present invention, a star wheel is rotated coaxially or eccentrically with the rotating roller shaft, which star wheel is provided on its circumference with container receiving pockets spaced equally to each other so as to avoid interference between the containers and is provided with brushes between the pockets, thereby the containers are fed forcefully to the test section.

In the present inventive apparatus, even a glass container with a lowered frictional coefficient due to deposition of substances such as water can be supplied without error into the test section between the container rotating roller and the pusher shoe, and it is assured that more than two containers are not supplied into the test section at the same time.

On the other hand, the provision of the brushes eliminates the possibility that the broken pieces of the containers having strength below the standard strength injure the adjacent containers, and removes the broken pieces attached to the pusher shoe so as to avoid the adverse effects on the subsequent containers by the broken pieces attached to the pusher shoe.

The rotation of the container rotating roller and the star wheel may be determined by supposing the container rotating roller as a sun gear, the container to be tested as a planet gear, the pusher shoe as a fixed internal gear, and the star wheel as an arm in a planetary gear.

At the bottom of each of the pockets provided on the star wheel, a bottom plate is provided in a circumferential direction of the star wheel so as to support the containers. The bottom plate is fixed by a pin on its one end, and locked by a latch on the other end. By disengaging the latch, the bottom plate turns around the pinned end. The distance between the outer circumferential surface of the container rotating roller and the side of the pusher shoe is set shorter by several millimeters than the outer diameter of the side wall of the glass container to be tested so that when the container to be tested is fed between the rotating roller and the pusher shoe, the pusher shoe is pushed backward the several millimeters from its initial position. If at this time the container is broken, the pusher shoe returns to its initial position. When the pusher shoe is pushed backward by the container, the latch is not disengaged, and only when the pusher shoe is at its initial position and the container to be tested is in the test section, or the pocket of the star wheel is positioned in the test section, with the latch disengage to rotate the bottom plate around its pinned end so that the container (already broken into pieces at this stage) drops below the star wheel and the broken pieces are completely discharged. The one-end freed bottom plate is reset to its original position by a cam positioned at the opposite side of the pusher shoe when the star wheel is rotated.

By the above construction, the present inventive apparatus can test continuously the glass containers moving on the conveyer line at a rate of 300 bottles per minute. This represents satisfactory testing capacity to meet with the production capacity of a modern glass container producing machine.

When the present inventive apparatus is to be adopted in a bottling shop, the desired object can be attained by arranging a plurality of the present inventive apparatuses in parallel in accordance with the capacity of the bottling machine. For example, if the capacity of the bottling machine is 1,200 bottles per minute, four test apparatuses of the present invention are arranged in parallel.

The present invention will be described in more details referring to the attached drawings.

Figure 1:
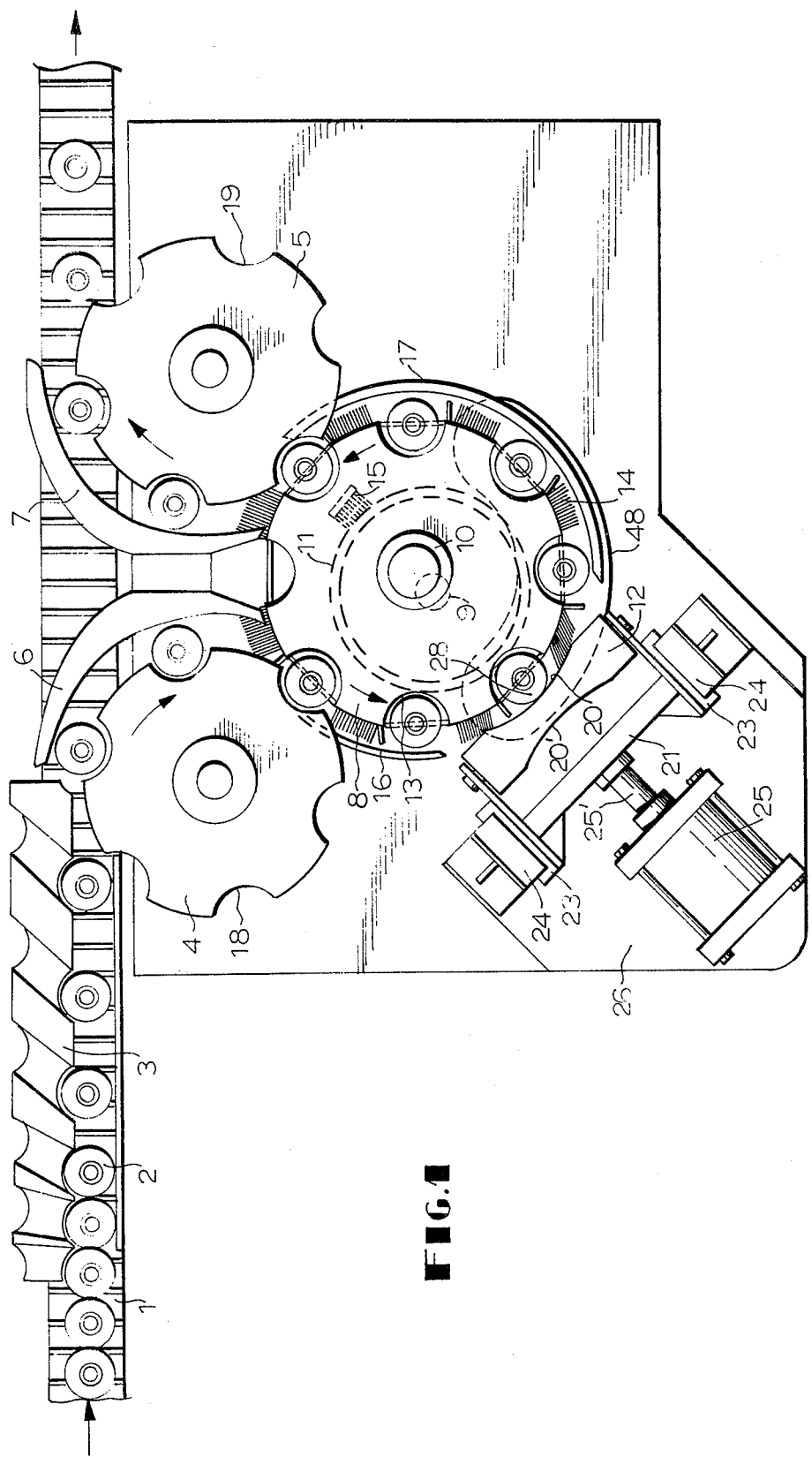
FIG. 1 is a general plane view showing the present inventive apparatus.
Figure 2:
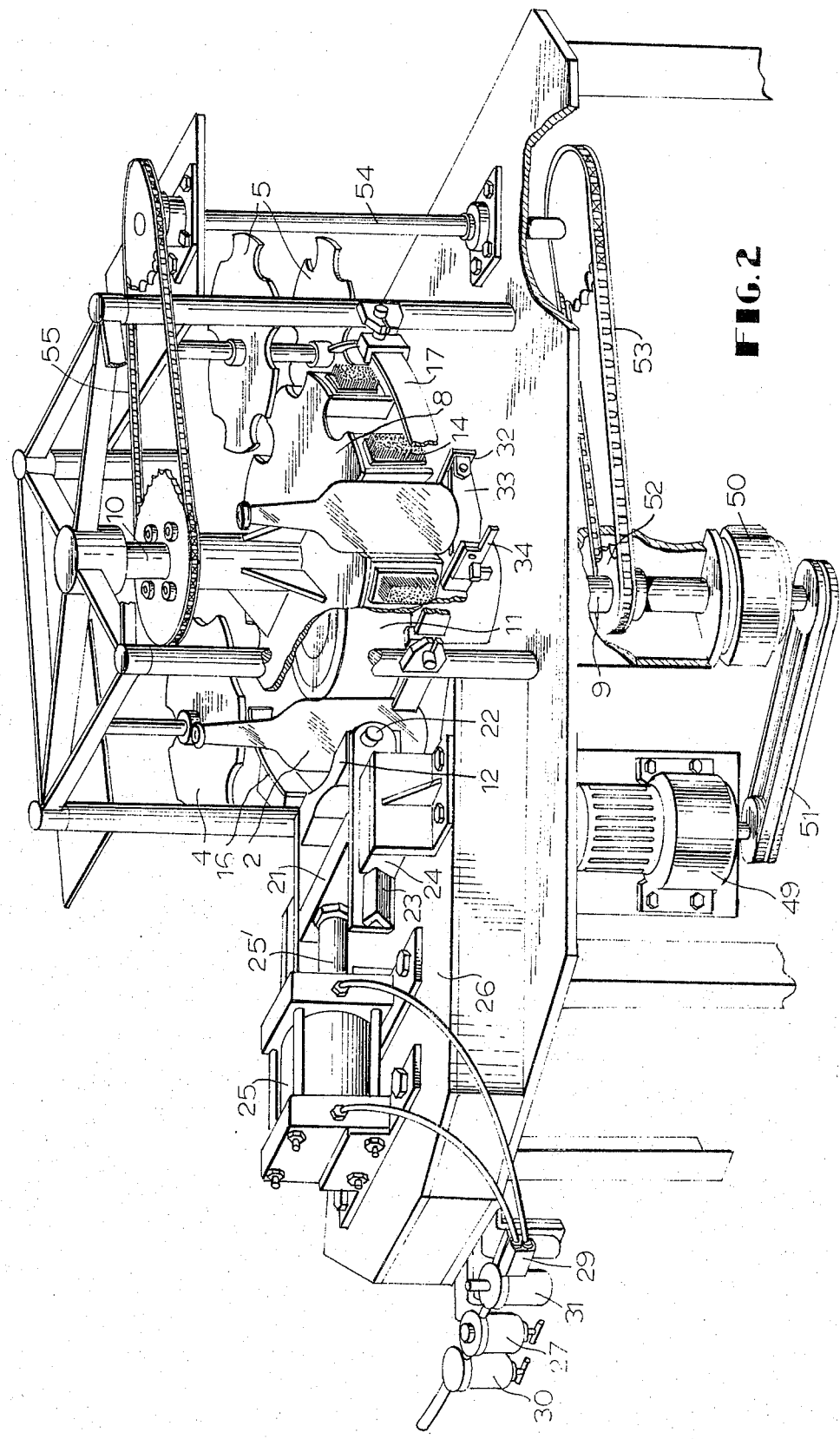
FIG. 2 is a slanted view showing parts of the apparatus shown in FIG. 1.

In the figures, the containers 2 are transferred in one line on the conveyer line 1 in the direction shown by an arrow in FIG. 1. The space between the adjacent containers is maintained constant by the timing screw 3 provided in parallel to the conveyer line 1, and the containers are introduced to the testing section by the introducing star wheel 4. A discharge star wheel 5 is provided for returning the tested containers again to the conveyer line 1. Guide rails 6 and 7 are arranged along parts of the outer circumferences of the star wheels 4 and 5.

There is a motor 49, a reduction gear 50 driven by a V-belt 51, and a roller 11 for rotating the containers attached on the shaft of the reduction gear 50. The reduction gear 50 is further provided with a chain sprocket 52 and rotates an intermediate shaft 54 by means of the chain 53. The driving force transmitted to the intermediate shaft 54 drives a star wheel 8 by means of a chain 55 and at the same time drives the star wheels 4 and 5 and the timing screw 3 by means of chains (not shown).

The star wheel 8 is eccentric to the roller shaft 9 and rotates around the shaft 10. It is not always necessary to arrange the star wheel 8 eccentric to the roller shaft 9, and as mentioned hereinafter, the star wheel 8 is arranged this way in order to make space for providing a brush 15 for removing the broken glass pieces. The rotation rate N of the star wheel 8 is slightly slower than the speed determined by $[Dr/(Di + Dr)]$ $Nr$, in which $Nr$ is the rotation number of the roller 11, $Dr$ is the outer diameter of the roller 11, and $Di/2$ is the radius of the recession of the pusher shoe 12.

Around the circumference of the star wheel 8, container receiving pockets 13 are provided in equal space, and the brush 14 for removing the broken glass pieces attached to the pusher shoe 12 is provided between the pockets, and the brush 15 for removing the broken glass pieces attached to the roller 11 is provided. The guide rails 16 and 17 are provided around the circumference of the star wheel 8 to prevent flying-out of the containers by centrifugal force.

On the introducing and discharging star wheels 4 and 5 respectively, there are provided also pockets 18 and 19 at the same circumferential pitches as the pocket 13 on the star wheel 8, and they are driven by a chain so as to engage with each other in the same manner as gears.

Around the circumference of the roller 11 and on the outer side of the pusher shoe 12, there is attached an elastic member (mainly of urethane rubber) so as to protect the glass containers from partial high pressure and to increase the friction coefficient with the containers to facilitate the biting of the containers so that the containers can be rotated more than 180°.

The pusher shoe 12 is provided with the arc-like recession 20 of $Di/2$ radius around the rotating center 9 of the roller 11, and the containers to be tested are pressed between the recession 20 and the roller 11. The pusher shoe 12 is rotatable around the shaft 22 provided at the top end of the bracket 21, and when the elastic member on the surface of the recession 20 on one side is worn or damaged, the pusher shoe 12 is rotated in a reverse direction so that the elastic member on the recession 20' on the opposite side may be used.

On both sides of the bracket 21, the guide rails 23 are welded, and the bracket is restricted in its vertical and horizontal movements by the guides 24. On the opposite side of the bracket 21, an air cylinder 25 is fixed by a bolt to the frame 26, and the cylinder piston is subjected to the air pressure regulated by the regulator valve 27 and is extended to its full length. At this time, the recession 20 of the pusher shoe 12 is positioned at 28, and when the glass containers come to this point, the rod 25' shortens several millimeters to give pressure to the container.

A magnet valve 29 is not normally actuated and is actuated only when the piston rod 25' is retreated to rotate the pusher shoe in the reverse direction. A filter 30 for cleaning the pressed air supply, and an oiler 31 for supplying lubricating oil to the magnet valve 29 and the air cylinder 25 are provided.

Figure 3:
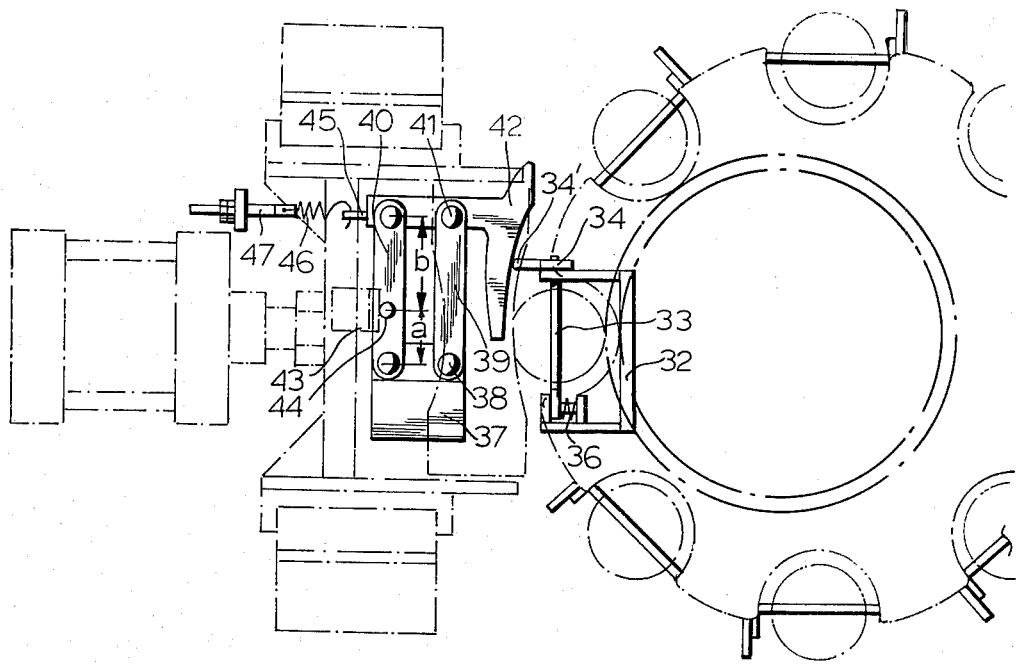
FIG. 3 is a plane view showing mainly the bottom plate and the mechanism for dismounting it.
Figure 4:
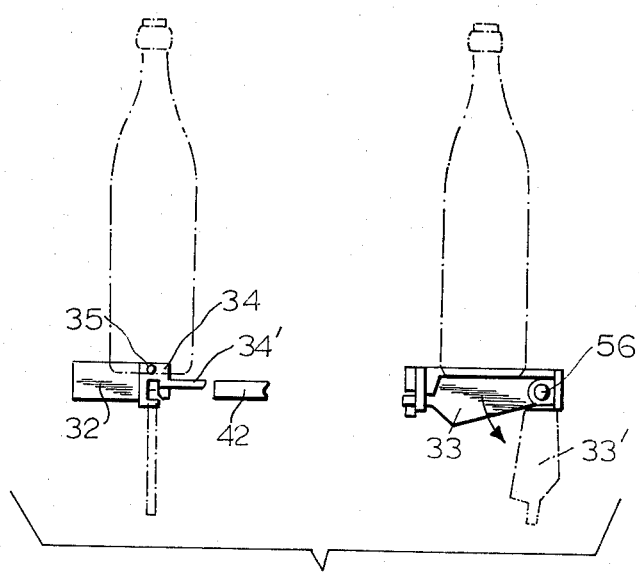
FIG. 4 is a detailed view of the bottom plate.

In FIGS. 3 and 4, the glass containers to be tested are supported by the brackets 32 provided at the lower portion of the star wheel 8 for each of the receiving pockets. The latch 34 is provided on one side to support the bottom plate 33, and the boss is provided on the other side to pin the bottom plate 33. The latch 34 is fixed by the pin 35 to the bracket 32, and by pushing the top end 34' of the latch 34, the bottom plate 33 is turned around the pin 35 and is disengaged. The latch 34 which is pushed and rotated returns to its original position by a spring (not shown). A spring 36 is provided at the pin 56 at the turning center of the bottom plate 33 to push down the bottom plate, when the latch 34 at one end of the bottom plate is disengaged so that the plate is easily turned around the pin 56 at the other end.

Below the bracket 21, there is provided a mechanism for dropping the bottom plate. Thus, links 39 and 40 are fixed by pins 38 to the bracket 37 bolted to the frame 26, and a cam plate 42 is provided by pins 41 at the top ends of the both links to form a parallel link. A pusher plate 43 bolted to the lower side of the bracket 21 and a stopper 44 on the link 40 contact each other, and when the glass container to be tested is being pressed between the roller 11 and the pusher shoe 12, the top end 34' of the latch 34 and the cam plate 42 are adjusted so as to have a slight space therebetween as shown in FIG. 3. When the glass container to be tested is broken, or when no container is present in the pocket, the piston rod 25' extends to its full length, the pusher shoe 12 moves to the position 28, the pusher plate 43 pushes the stopper 44, and the movement of the pusher plate 43 is amplified by $(a + b)/a$ times and transmitted to the cam plate 42, so that the top end 34' of the latch 34 is pushed to drop the bottom plate. The dropped bottom plate 33' is reset to the original position by a cam (not shown) fixed to the frame when the star wheel 8 is rotated. In order to avoid failures of the bottom plate dropping mechanism due to the disorder of the links 39 and 40, and in order to maintain the pusher plate 43 in contact with the stopper 44, a hook 45 is provided at the top end of the cam plate 42 to pull them by means of a spring 46. The force of the spring is adjusted by an adjusting screw 47. The broken pieces of the glass container are dropped through a notch 48 in the frame (FIG. 1.).

What is claimed is:

1. A glass container testing apparatus comprising:
    a rotating star wheel having receiver pockets equally spaced around the circumference thereof for receiving and directing individual containers through the apparatus;
    a movable pusher shoe movable toward and away from the circumference of said star wheel for imparting a test force against a container in one of said receiver pockets;
    pusher means connected to said pusher shoe for providing the force necessary to operate said pusher shoe;
    a container-rolling roller having a rotational axis parallel to the longitudinal axis of the container to be tested located at a distance below said star wheel and positioned so that said rolling roller abuts the container to be tested in the receiver pocket of said star wheel at a point opposite said pusher shoe so that the container will rotate at least 180° due to the friction exerted against the container between the pusher shoe and the rolling roller; and
    brushes between the adjacent receiver pockets of said star wheel for protecting the glass containers adjacent to the container being tested from injury by broken pieces of glass when a container is broken between said pusher shoe and said rolling roller and for removing broken pieces of glass attached to said pusher shoe.

2. An apparatus as claimed in claim 1 further comprising:
    a pin-hinged bottom plate in each of said receiver pockets for supporting the bottom of each container to be tested;
    latch means for locking the free end of said pin-hinged bottom plate into position for holding a container within said receiver pocket; and
    pusher cam means engagable with said latch means for disengaging said latch means in response to the movement of said pusher shoe toward said rolling roller whenever the container to be tested between the pusher shoe and the rolling roller is broken, whereby said bottom plate is released and the broken container is discharged from said receiver pocket.

* * * * *